United States Patent
Orsak et al.

(10) Patent No.: US 11,150,158 B2
(45) Date of Patent: Oct. 19, 2021

(54) STRUCTURAL IMPACT DETECTION AND CLASSIFICATION SYSTEMS AND METHODS

(71) Applicant: SENSR Monitoring Technologies LLC, Georgetown, TX (US)

(72) Inventors: John P. Orsak, Austin, TX (US); Emmanuel D. Stewart, Georgetown, TX (US); Jakob A. Marsala, Austin, TX (US); Walter F. Bleser, II, Denver, CO (US)

(73) Assignee: SENSR MONITORING TECHNOLOGIES LLC, Georgetown, TX (US)

( * ) Notice: Subject to any disclaimer, the term of this patent is extended or adjusted under 35 U.S.C. 154(b) by 276 days.

(21) Appl. No.: 16/148,901

(22) Filed: Oct. 1, 2018

(65) Prior Publication Data

US 2019/0101471 A1    Apr. 4, 2019

Related U.S. Application Data

(60) Provisional application No. 62/568,132, filed on Oct. 4, 2017.

(51) Int. Cl.
```
G01M 5/00      (2006.01)
G08B 29/18     (2006.01)
G08B 29/26     (2006.01)
```
(52) U.S. Cl.
CPC ......... *G01M 5/0066* (2013.01); *G08B 29/185* (2013.01); *G08B 29/26* (2013.01)

(58) Field of Classification Search
CPC ............. G06K 9/00536; G06K 9/0051; G06K 9/00523; G01M 5/0008; G01M 5/0066; G01M 5/00
USPC .......................................................... 702/33
See application file for complete search history.

(56) References Cited

U.S. PATENT DOCUMENTS

| | | | | |
|---|---|---|---|---|
| 5,327,358 | A | * | 7/1994 | Stubbs ................... G01H 17/00 702/36 |
| 7,786,850 | B1 | * | 8/2010 | Arcaini ..................... G08G 1/04 340/436 |
| 9,267,862 | B1 | * | 2/2016 | Kavars ................ G01M 5/0033 |
| 10,228,278 | B2 | * | 3/2019 | Chen ........................ G01H 1/00 |

* cited by examiner

*Primary Examiner* — Leslie J Evanisko
(74) *Attorney, Agent, or Firm* — Parsons Behle & Latimer

(57) ABSTRACT

A method for classifying accelerometer data of a structure includes obtaining acceleration data from an accelerometer positioned to monitor a structure and receive vibrations from the structure. The acceleration data includes a plurality of measurements. The method includes selecting a subset of the plurality of measurements as an event signal. The subset of the plurality of measurements have a magnitude that exceeds a noise floor and includes a first measurement, a second measurement, and a plurality of intermediate measurements between the first measurement and the second measurement. The plurality of intermediate measurements exceed an event threshold. The event threshold is greater than the noise floor. The method includes comparing the event signal to a set of historical events and classifying the event signal as an event type.

20 Claims, 1 Drawing Sheet

STRUCTURAL IMPACT DETECTION AND CLASSIFICATION SYSTEMS AND METHODS

CROSS REFERENCE TO RELATED APPLICATIONS

The present application claims the benefit of priority under 35 U.S.C. § 119 to U.S. Provisional Application No. 62/568,132, filed Oct. 4, 2017, entitled "STRUCTURAL IMPACT DETECTION AND CLASSIFICATION SYSTEMS AND METHODS," the disclosure of which is incorporated herein by reference in its entirety.

FIELD OF THE DISCLOSURE

The embodiments described herein relate generally to structural health monitoring. In particular, the disclosure is related to the use of accelerometer data to define an event period and classify types of events that cause vibrations within a structure.

BACKGROUND

Structures are generally subject to outside forces that can cause vibrations within a structure. For example, bridges may be susceptible to impacts from vehicles that exceed the required clearance and may also be subject to vehicles, including trains, traveling across of the bridge. Structures may be influenced by nearby construction, traffic, or other events. Structures may also be subject to an extent of vibration that is anticipated. For example, high-rise structures may be built to move with high winds to avoid buckling and structures may house heavy machinery or be located next to a roadway such that vibrations are incidentally transferred into the structure.

Current methods and systems for detecting events on a structure may include strict threshold-based monitoring where an impact event is defined by any measurements that exceed the threshold. For example, an "event" may be classified as any period during which vibration levels exceed a certain threshold. If the threshold is set too low, then the system may produce an exceeding number of false-positives and events lengths may become artificially inflated. If the threshold is set too high, then the system may miss lower magnitude impacts, such as a vehicle scraping along an underside of a bridge. Known methods and systems may not determine the nature of an event and therefore produce false results. Current systems may be reliant on railroad personnel, the police, and the general public to report strikes. Without any notification, a structure may go uninspected but remain open to traffic. As a result, it could be many hours or days until debris or new damage is noticed and the structure is inspected.

SUMMARY

The present disclosure is directed to systems and methods that overcome some of the problems and disadvantages discussed above. Other disadvantages may exist.

A method for classifying accelerometer data of a structure includes obtaining an event signal of accelerometer data. The accelerometer data is comprised of measurements of an accelerometer positioned to monitor a structure. The measurements include a first measurement, a second measurement, and a plurality of intermediate measurements between the first measurement and the second measurement. The method includes determining at least one event characteristic of the event signal, comparing each of the at least one event characteristic of the event signal to a corresponding one of a plurality of characteristic ranges of a set of historical events, and classifying the event signal as an event type. The at least one event characteristic is selected from the group consisting of a slope-to-peak value, a slope-from-peak value, a standard deviation, and an event period. The slope-to-peak value is a magnitude of a slope of a rise over time of the first measurement to a measurement having the greatest magnitude. The slope-from-peak value is a magnitude of a slope of a rise over time of the measurement having the greatest magnitude to the second measurement.

The event categories may include impact events and non-impact events. The impact events may include a bridge scrape event. The at least one event characteristic may include at least the event period. The at least one event characteristic may include at least the standard deviation. The at least one event characteristic may include at least the slope-to-peak value. The at least one event characteristic may include at least the slope-to-peak value and the slope-from-peak value.

The at least one event characteristic of the event signal may be a plurality of event characteristics. The comparing each of the plurality of event characteristics of the event signal to a corresponding one of a plurality of characteristic ranges of a set of historical events may include classifying each of the plurality of event characteristics of the event signal as an event type, and weighing the classifications of the plurality of event characteristics of the event signal in order to classifying the event signal as an event type. The method may include determining a confidence level of the classification of the event signal. The method may include transmitting a notification of the event type of the classified event signal.

The method may include determining the characteristic ranges of the set of historical events by determining event characteristics for each of the historical events within the set of historical events, classifying each of the historical events within the set of historical events as an event type, and creating a lower limit and an upper limit of the event characteristics of the set of historical events for each event type. The method may include calibrating the accelerometer before obtaining the event signal. The method may include updating the set of historical events with the classification of the event signal and the at least one event characteristic of the event signal. The method may include continuously collecting and time-referencing the accelerometer data. The accelerometer data may include accelerometer measurements for a plurality of axes.

The method may include creating the event signal by setting a noise floor and an event threshold, obtaining the measurements of the accelerometer, and setting the event signal as the measurements of the accelerometer from the first measurement to the second measurement. The measurements include the first measurement, the second measurement, and at least one intermediate measurement. The first measurement has a magnitude that exceeds the noise floor. The second measurement has a magnitude that exceeds the noise floor. The at least one intermediate measurement exceeds the event threshold. The magnitudes of all of the measurements within the event signal exceed the noise floor. A magnitude of a measurement immediately preceding the first measurement may not exceed the noise floor and a magnitude of a measurement immediately following the second measurement may not exceed the noise floor.

A method for determining an event signal corresponding to an event includes setting a noise floor and an event threshold, obtaining a plurality of measurements of an accelerometer, determining at least one intermediate measurement of the plurality of measurements that exceeds the event threshold, determining a first measurement of the plurality of measurements that precedes the at least one intermediate measurement and has a magnitude that exceeds the noise floor, determining a second measurement of the plurality of measurements that follows the at least one intermediate measurement and has a magnitude that exceeds the noise floor, and setting the event signal as the plurality of measurements from the first measurement to the second measurement. The magnitudes of all of the measurements within the event signal exceed the noise floor. A magnitude of a measurement immediately preceding the first measurement may not exceed the noise floor and a magnitude of a measurement immediately following the second measurement may not exceed the noise floor.

An embodiment of a method for classifying accelerometer data of a structure includes obtaining acceleration data from an accelerometer positioned to monitor a structure and receive vibrations from the structure. The acceleration data includes a plurality of measurements. The method includes selecting a subset of the plurality of measurements as an event signal. The subset of the plurality of measurements have a magnitude that exceeds a noise floor and includes a first measurement, a second measurement, and a plurality of intermediate measurements between the first measurement and the second measurement. The plurality of intermediate measurements exceed an event threshold. The event threshold is greater than the noise floor. The method includes comparing the event signal to a set of historical events and classifying the event signal as an event type.

Figure 1:
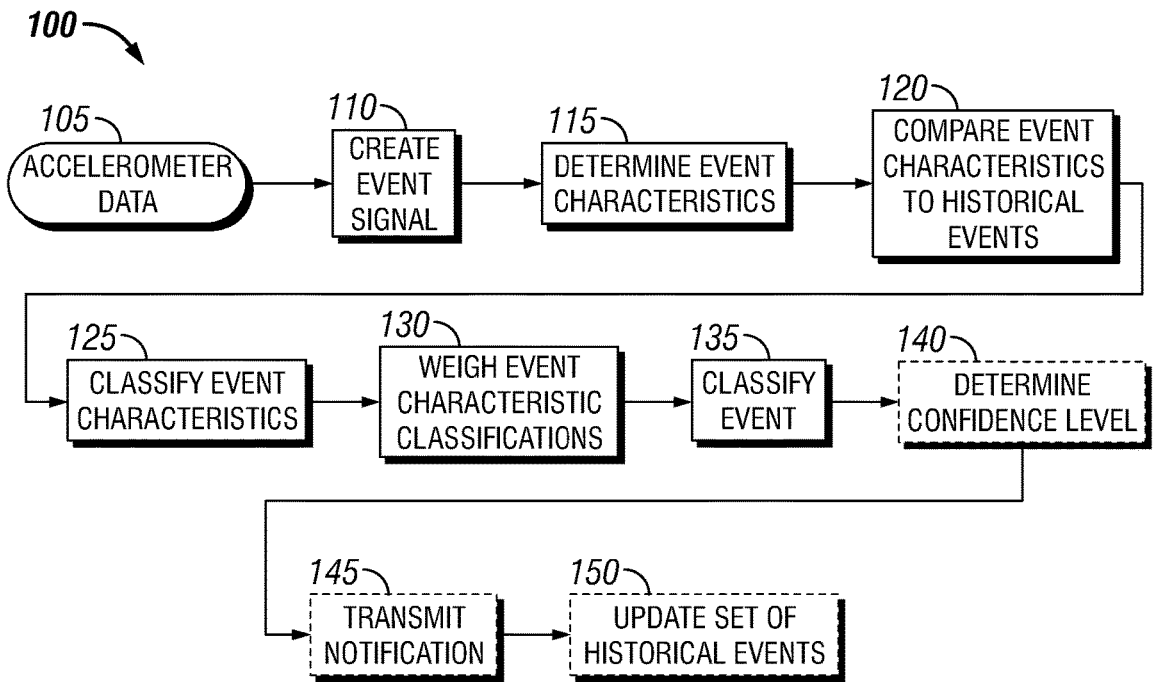
FIG. 1 shows a flowchart of an embodiment of a method for classifying structural impacts.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

FIG. 1 shows a flowchart of an embodiment of a method 100 for classifying structural impacts. The method 100 includes obtaining accelerometer data 105. The accelerometer data 105 is collected from an accelerometer positioned to receive vibrations from a structure being monitored. The accelerometer data 105 may include measurements for multiple axes, such as a tri-axial accelerometer. The accelerometer data 105 may include time references that correspond to the measurements. The method 100 may include collecting the accelerometer data 105 or analyzing pre-collected accelerometer data 105. The accelerometer data 105 may be collected and analyzed in real-time or within a short period thereafter. The method 100 may include calibrating the accelerometer for expected vibrations within the structure.

Figure 2:
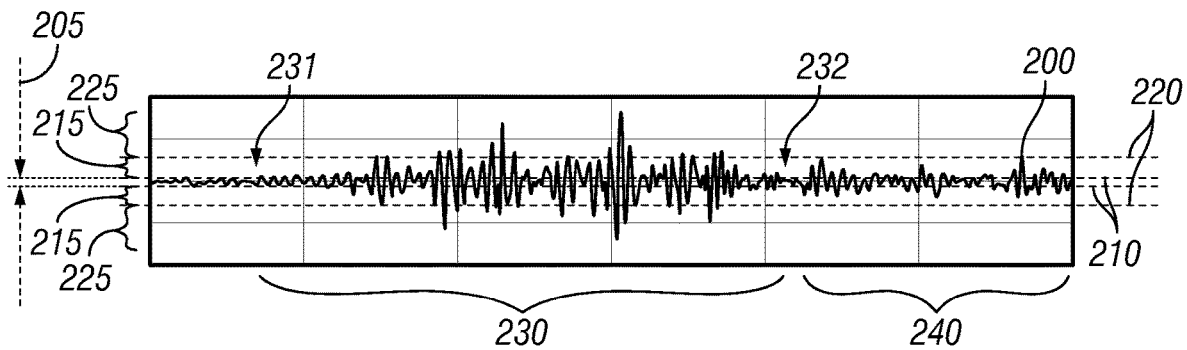
FIG. 2 shows a diagram of an example of accelerometer measurements in one axis and an event signal.

The method 100 includes creating an event signal from the accelerometer data 105 in Action 110. FIG. 2 shows a diagram of an example of accelerometer measurements 200 in one axis and an event signal 230. The event signal 230 corresponds to a period when an event is expected to have occurred. The event signal 230 may be determined through the use of a noise floor 210 and an event threshold 220. Measurements having a magnitude below the noise floor 210 may be considered quiet values 205. Quiet values 205 may correspond to expected vibrations within a structure. Measurements having a magnitude above the noise floor 210 may be considered noisy values 215. The event threshold 220 corresponds to a pre-selected value that is above the noise floor 210. Measurements having a magnitude above the event threshold 220 are considered event values 225. The event signal 230 comprises both noisy values 215 and event values 225.

The event signal 230 extends from a first time 231, when the magnitude of the measurements 200 first exceeds the noise floor 210, to a second time 232, when the magnitude of the measurements 200 fall below the noise floor 210, and contains at least some measurements 200 with magnitudes that exceed the event threshold 220 between the first time 231 and the second time 232. The event period corresponds to the duration from the first time 231 to the second time 232 of the event signal 230. In some embodiments, the event period may be defined by an event signal 230 on any axis of the accelerometer. In addition, the event signal 230 may include measurements on other axes during the event period. For example, measurements may be primarily within one axis and measurements on other axes may not exceed an event threshold for that axis.

The event signal 230 may be determined by setting the noise floor 210 and the event threshold 220. The measurements 200 from the accelerometer may be obtained. Intermediate (relative in time) measurements 200 having event values 225 may be determined. First and second measurements having noisy values 215 may be determined, where the first measurement precedes the intermediate measurements and the second measurement follows the intermediate measurements. The magnitudes of all of the measurements 200 between the first measurement and the second measurement may exceed the noise floor 210. A magnitude of a measurement immediately preceding the first measurement may not exceed the noise floor and a magnitude of a measurement immediately following the second measurement may not exceed the noise floor. In some embodiments, intermediate measurements 200 having event values 225 that are separated by measurements having magnitudes below the noise floor 210 may be considered as part of separate event signals 230.

Referring still to FIG. 2, a second time period 240 is shown. Within the second time period 240, measurements 200 of the accelerometer exceed the noise floor 210 but do not exceed the event threshold 220. Therefore, an event signal 230 is not created. In some embodiment, multiple event thresholds 220 and/or multiple noise floors 210 may be used to create event signals 230 of different categories. By way of example, a first category may include a lower threshold for lower magnitude impacts, such as a vehicle scraping along an underside of a bridge, and a second category may include a higher threshold for higher magnitude impacts, such as a marine-vessel striking a bridge support.

The method 100 includes determining event characteristics from the event signal 230 in Action 115. The event characteristics include at least one of a slope-to-peak value 250 (shown in FIG. 3), a slope-from-peak value 260 (shown in FIG. 3), a standard deviation, and/or the event period. Separate event characteristics may be calculated for measurements of each axis of the event signal 230.

Figure 3:
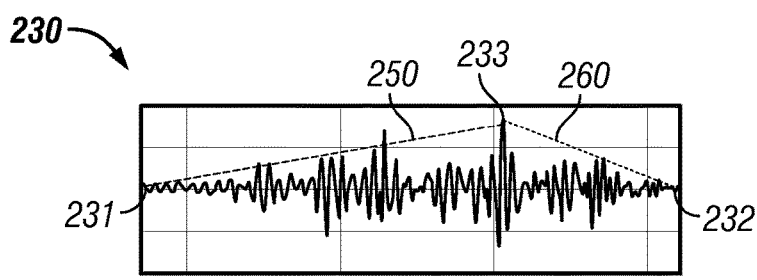
FIG. 3 shows a diagram of an example of an event signal.

FIG. 3 shows a diagram of the event signal 230 created from the accelerometer measurements 200 shown in FIG. 2. The event period corresponds to the duration of the event signal 230. A greater event period is less likely to correlate to an impact than another event having a lesser event period. A standard deviation may be calculated over the event period to determine the extent of deviation in the measurements of the event signal 230. A greater standard deviation is more likely to correlate to an impact than another event having a lesser standard deviation, such as vibrations from vehicles traveling over the structure.

The slope-to-peak value 250 corresponds to the magnitude of the slope of the rise over time of a nominal initial value, such as the measurement at the first time 231 of the event signal 230, to the measurement 233 of the event signal 230 having the greatest magnitude. A slope-to-peak value 250 having a greater value is more likely to correlate to an impact than another event having a lesser slope-to-peak value 250. The slope-from-peak value 260 corresponds to the magnitude of the slope of the rise over time of the measurement 233 of the event signal 230 having the greatest magnitude to a nominal final value, such as the measurement at the second time 232 of the event signal 230. A slope-from-peak value 260 having a greater value is more likely to correlate to an impact than another event having a lesser slope-from-peak value 260. A slope-to-peak value 250 that is relatively close to the slope-from-peak value 260 may indicate a more symmetrical event and is less likely to be an impact.

Referring again to FIG. 1, action 115 of method 100 may include determining the event characteristics of a set of historical events or the event characteristics of the set of historical events may have been previously determined. The event characteristics of the set of historical events each include a minimum and a maximum value. The set of historical events may include events of multiple event categories. For instance, the set of historical events may include an impact category that corresponds to events such as bridge scrapes or strikes. The set of historical events may include a non-impact category, such as a traffic category that corresponds to events such as vehicles traveling under a bridge or nearby, acoustical vibrations, or a train traveling over a bridge. The set of historical events may consist of events specific to a particular structure or to similarly constructed structures. Each of the event characteristics of the historical events includes a characteristic range.

The method 100 includes Action 120 of comparing the event characteristics of the event signal with the characteristic range of the corresponding event characteristic of the set of historical events. Each of the event characteristics of the event signal may then be classified with an event type in Action 125. The classifications of individual event characteristics may then be weighed in Action 130 and an event classification is determined for the event signal in Action 135. By way of example, each of the event characteristics may be equally weighted. In some embodiments, only event characteristics for axes with measurements exceeding an event threshold may be used, or may be given more weight.

The method 100 may include Action 140 to determine a confidence level of the event classification. For instance, a lower confidence level may be assigned to an event signal where less than all of the event characteristics indicate an impact category than another event signal where all of the event characteristics indicate an impact category. Furthermore, the confidence level may be increased with a greater number of samples within the set of historical events. The method 100 may include transmitting a notification of the event classification to a remote location in Action 145.

The method 100 may include adding the event signal and event characteristics into the set of historical events. The event characteristics of the set of historical events may be refined using the revised set of historical events to improve the classification and confidence level when classifying additional events in Action 150.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable by a programmable system including at least one programmable processor coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running within the respective computers and having a client-server relationship to each other. In addition, computing devices (i.e., devices having at least one data processor and memory, etc.) can communicate in a peer to peer fashion.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented within a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features.

The subject matter described herein can be embodied in systems, apparatus, methods, and/or articles of any desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. Other implementations may be within the scope of the following claims. Other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof

What is claimed is:

1. A method for using accelerometer data of a structure, the method comprising:
   creating an event signal from accelerometer data, via a processor, the accelerometer data being comprised of a plurality of measurements of an accelerometer positioned to monitor a structure and receive vibrations from the structure, the plurality of measurements including a first measurement, a second measurement, and a plurality of intermediate measurements between the first measurement and the second measurement;
   determining, via the processor, at least one event characteristic of the event signal, the at least one event characteristic being selected from the group consisting of a slope-to-peak value, a slope-from-peak value, and a standard deviation, the slope-to-peak value being a magnitude of a slope of a rise over time of the first measurement to the intermediate measurement having the greatest magnitude, the slope-from-peak value being a magnitude of a slope of a rise over time of the intermediate measurement having the greatest magnitude to the second measurement;
   comparing, via the processor, each of the at least one event characteristic of the event signal to a corresponding one of a plurality of characteristic ranges of a set of historical events, the processor being coupled to a storage system and receiving the plurality of characteristic ranges of the set of historical events from the storage system; and
   classifying, via the processor, the event signal as an event type.

2. The method of claim 1, wherein the event type is selected from a group of event categories including an impact event or a non-impact event.

3. The method of claim 2, wherein the impact event category includes a bridge scrape event.

4. The method of claim 1, wherein the at least one event characteristic of the event signal is a plurality of event characteristics and wherein the comparing each of the plurality of event characteristics of the event signal to the corresponding one of the plurality of characteristic ranges of a set of historical events comprises:
   classifying each of the plurality of event characteristics of the event signal as an event type; and
   weighing the classifications of the plurality of event characteristics of the event signal in order to classifying the event signal as an event type.

5. The method of claim 4, further comprising determining, via the processor, a confidence level of the classification of the event signal.

6. The method of claim 1, further comprising determining, via the processor, the characteristic ranges of the set of historical events by:
   determining event characteristics for each historical event within the set of historical events;
   classifying each historical event within the set of historical events as an event type; and
   creating a lower limit and an upper limit of the event characteristics of the set of historical events for each event type.

7. The method of claim 6, further comprising updating the set of historical events with the classification of the event signal and the at least one event characteristic of the event signal.

8. The method of claim 1, wherein the at least one event characteristic further includes an event period.

9. The method of claim 8, wherein the at least one event characteristic is a plurality of event characteristics and includes the standard deviation, the event period, the slope-to-peak value, and the slope-from-peak value.

10. The method of claim 1, wherein the at least one event characteristic includes both the slope-to-peak value and the slope-from-peak value.

11. The method of claim 1, wherein the accelerometer data includes accelerometer measurements for a plurality of axes.

12. The method of claim 1, wherein creating the event signal further comprises:
   setting a noise floor and an event threshold;
   obtaining the measurements of the accelerometer, the measurements including the first measurement having a magnitude that exceeds the noise floor, the second measurement having a magnitude that exceeds the noise floor, and at least one intermediate measurement that exceeds the event threshold; and
   setting the event signal as the measurements of the accelerometer from the first measurement to the second measurement.

13. The method of claim 12, wherein the magnitudes of all of the measurements within the event signal exceed the noise floor.

14. The method of claim 13, wherein a magnitude of a measurement immediately preceding the first measurement does not exceed the noise floor and wherein a magnitude of a measurement immediately following the second measurement does not exceed the noise floor.

15. A method for determining an event, the method comprising:
- creating an event signal by setting a noise floor and an event threshold;
- obtaining a plurality of measurements of an accelerometer via a processor;
- determining, via the processor, at least one intermediate measurement of the plurality of measurements that exceeds the event threshold;
- determining, via the processor, a first measurement of the plurality of measurements that precedes the at least one intermediate measurement, the first measurement having a magnitude that exceeds the noise floor;
- determining, via the processor, a second measurement of the plurality of measurements that follows the at least one intermediate measurement, the second measurement having a magnitude that exceeds the noise floor; and
- setting, via the processor, the event signal as the plurality of measurements from the first measurement to the second measurement.

16. The method of claim 15, wherein the magnitudes of all of the measurements within the event signal exceed the noise floor.

17. The method of claim 16, wherein a magnitude of a measurement immediately preceding the first measurement does not exceed the noise floor and wherein a magnitude of a measurement immediately following the second measurement does not exceed the noise floor.

18. The method of claim 15, further comprising determining, via the processor, at least one event characteristic of the event signal, the at least one event characteristic being selected from the group consisting of a slope-to-peak value, a slope-from-peak value, and a standard deviation, the slope-to-peak value being a magnitude of a slope of a rise over time of the first measurement to the intermediate measurement having the greatest magnitude, the slope-from-peak value being a magnitude of a slope of a rise over time of the intermediate measurement having the greatest magnitude to the second measurement.

19. A method for using accelerometer data of a structure, the method comprising:
- obtaining acceleration data from an accelerometer positioned to monitor a structure and receive vibrations from the structure, the acceleration data received by a processor and including a plurality of measurements;
- selecting, via the processor, a subset of the plurality of measurements to create an event signal, the subset of the plurality of measurements having a magnitude that exceeds a noise floor, the event signal including a first measurement, a second measurement, and a plurality of intermediate measurements between the first measurement and the second measurement, the plurality of intermediate measurements exceeding an event threshold, the event threshold being greater than the noise floor;
- comparing, via the processor, the event signal to a set of historical events, the processor being coupled to a storage system and receiving the plurality of characteristic ranges of the set of historical events from the storage system; and
- classifying, via the processor, the event signal as an event type.

20. The method of claim 19, further comprising determining, via the processor, at least one event characteristic of the event signal, the at least one event characteristic being selected from the group consisting of a slope-to-peak value, a slope-from-peak value, and a standard deviation, the slope-to-peak value being a magnitude of a slope of a rise over time of the first measurement to the intermediate measurement having the greatest magnitude, the slope-from-peak value being a magnitude of a slope of a rise over time of the intermediate measurement having the greatest magnitude to the second measurement.

* * * * *